J. W. BROWN, Jr.
THRUST BEARING.
APPLICATION FILED DEC. 28, 1920.
1,386,491. Patented Aug. 2, 1921.
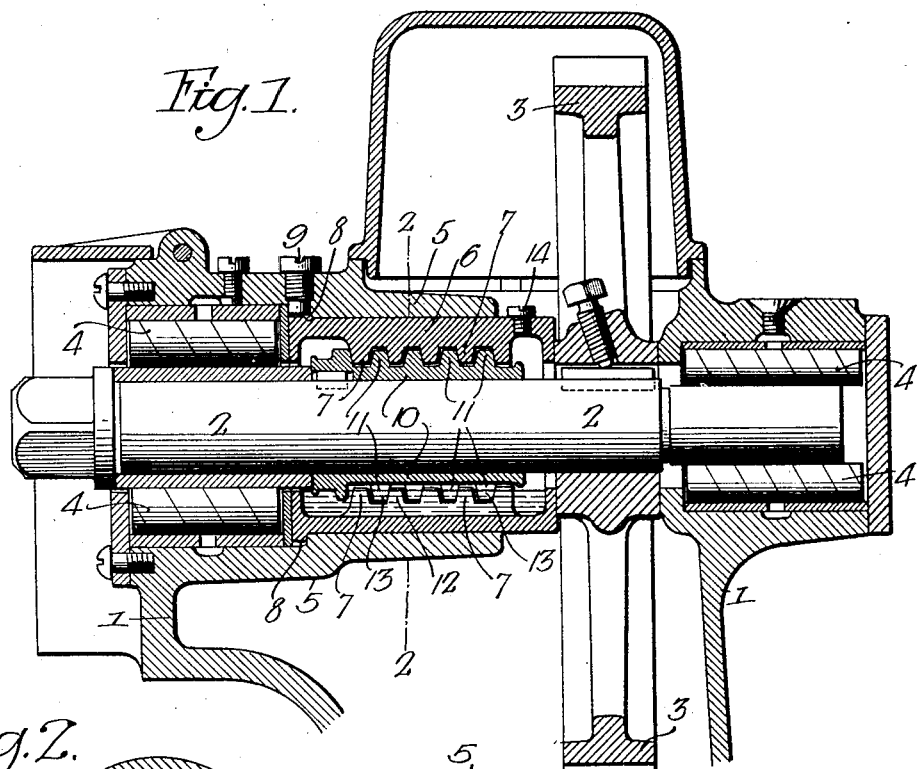
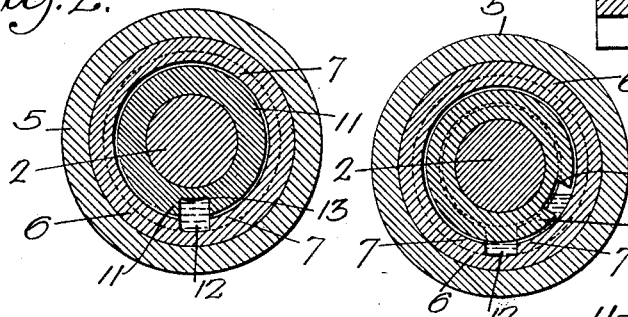
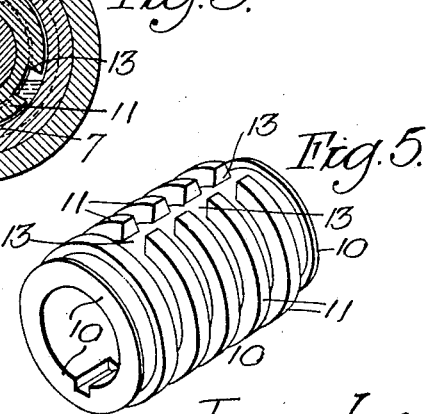
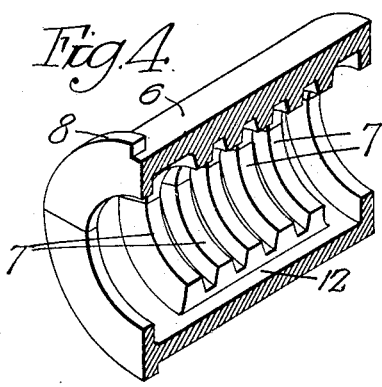
Inventor-
John W. Brown, Jr.
by his Attorneys-
Howson & Howson

UNITED STATES PATENT OFFICE.

JOHN WILSON BROWN, JR., OF PHILADELPHIA, PENNSYLVANIA.

THRUST-BEARING.

1,386,491.   Specification of Letters Patent.   Patented Aug. 2, 1921.

Application filed December 28, 1920. Serial No. 433,611.

*To all whom it may concern:*

Be it known that I, JOHN WILSON BROWN, Jr., a citizen of the United States, residing in Philadelphia, Pennsylvania, have invented certain Improvements in Thrust-Bearings, of which the following is a specification.

My invention relates to certain improvements in thrust bearings of the type in which annular ribs on a shaft travel in grooves in a fixed bearing. The object of my invention is to provide means for lubricating the bearing. This object I attain in the following manner, reference being had to the accompanying drawings, in which—

Figure 1 is a longitudinal sectional view of a machine showing my improved thrust bearing;

Fig. 2 is a sectional view on the line 2—2, Fig. 1;

Fig. 3 is a sectional view, similar to Fig. 2, showing the shaft and its sleeve partly turned;

Fig. 4 is a sectional perspective view of the bearing; and

Fig. 5 is a perspective view of the sleeve which is secured to the shaft.

In the present instance 1 is a frame of a machine, 2 is a shaft on which is a gear wheel 3, driven in any suitable manner. At each end of the frame 1 are roller bearings 4 of any type desired and in which the shaft is mounted, although plain bearings may be used without departing from the main feature of the invention.

The frame 1 has an extension 5 having a cylindrical opening in which is mounted a two part thrust bearing 6 having annular ribs 7. This bearing has a flange 8 at the forward end and a set screw 9 screwed into the frame extends into a notch in the flange and prevents the bearing turning in the frame, while the flange 8 resists the thrust transmitted to the bearing 6 from the shaft 2. Other means of holding the thrust bearing in the frame may be used without departing from the main feature of the invention.

Keyed to the shaft 2 is a sleeve 10 and this sleeve has a series of ribs 11, spaced apart as shown, which extend into the spaces between the ribs 7 of the bearing 6.

In order to lubricate the bearing surfaces I form a longitudinal slot 12 in the lower section of the bearing 6. This slot extends through the ribs and into the body of the bearing as shown clearly in Figs. 1 and 4, and forms a channel for the oil or other lubricant that accumulates in the lower portion of the bearing. I also form a slot 13 in each rib 11 of the sleeve as clearly shown in Fig. 5, and the depth of the lubricant in the bottom of the bearing is such that the ribs of the sleeve travel in this lubricant. When the slotted portion 13 of the sleeve is in line with the slot 12 in the bearing the oil will flow into the space thus formed, and as the sleeve rotates the end of the ribs will lift a given quantity of the lubricant and distribute it over the bearing surface of the ribs, thus the bearing is constantly lubricated. In the upper portion of the bearing 6 there is an opening through which oil or other lubricant can be poured into the bearing and this opening is closed by a screw plug 14.

While I have shown the bearing having a longitudinal groove in the base, this groove may be dispensed with particularly where the lubricant is an oil, as sufficient oil may flow into the groove of the ribs of the sleeve so that the ribs will carry the lubricant and distribute it over the bearing surface. In some instances the grooves in the sleeve may be staggered or shallow. Pockets may be formed in the ribs of the sleeve which will take up a given amount of oil from the bottom of the bearing and distribute it over the bearing faces, but I prefer the construction illustrated in the drawings.

I claim:

1. The combination in a thrust bearing of a fixed bearing having annular thrust ribs thereon and a shaft having annular thrust ribs which extend into spaces between the ribs of the bearing to transmit the thrust to said ribs, the ribs of the shaft being recessed to allow a lubricant to pass therein and to be carried by said ribs to the fixed bearing surfaces to lubricate the same.

2. The combination in a thrust bearing of a fixed bearing having a series of annular thrust ribs, a longitudinal slot extending through the ribs, said bearing being formed to hold a certain amount of lubricant in the lower portion thereof, a shaft extending through the fixed bearing, and thrust ribs on the shaft extending into spaces between the ribs of the bearing to transmit the thrust to said ribs, each rib being slotted to form a recess so that as said shaft is rotated; the ribs will take up a given amount of lubricant and distribute it over the bearing faces of the fixed ribs.

3. The combination in a thrust bearing of a frame, a fixed bearing located in the frame, and means for holding the bearing to the frame, said bearing having a series of internal ribs spaced apart, a slot extending longitudinally through the ribs and a portion of the bearing so as to allow a lubricant to freely circulate in the bottom of the bearing, a shaft extending through the bearing; a sleeve secured to the shaft and having a series of ribs extending into the spaces between the ribs and the bearing, the said sleeve being slotted longitudinally, said slot extending through the ribs so that the ribs will take from the bottom of the bearing a given quantity of lubricant as the shaft rotates.

JOHN WILSON BROWN, Jr.